US011802209B2

(12) United States Patent
Joo et al.

(10) Patent No.: US 11,802,209 B2
(45) Date of Patent: Oct. 31, 2023

(54) ADHESIVE COMPOSITION, ADHESIVE FILM, ADHESIVE OPTICAL FILTER AND DISPLAY DEVICE

(71) Applicant: LG CHEM, LTD., Seoul (KR)

(72) Inventors: Mun Kyu Joo, Daejeon (KR); Deok Hwan Kim, Daejeon (KR); Yeon Keun Lee, Daejeon (KR); Minhyuk Yun, Daejeon (KR); Bongjun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 167 days.

(21) Appl. No.: 17/621,490

(22) PCT Filed: Feb. 18, 2021

(86) PCT No.: PCT/KR2021/002065
§ 371 (c)(1),
(2) Date: Dec. 21, 2021

(87) PCT Pub. No.: WO2021/167368
PCT Pub. Date: Aug. 26, 2021

(65) Prior Publication Data
US 2022/0282092 A1    Sep. 8, 2022

(30) Foreign Application Priority Data

Feb. 20, 2020  (KR) .................. 10-2020-0021095

(51) Int. Cl.
*C09B 45/16* (2006.01)
*C09B 45/20* (2006.01)
*C09J 11/06* (2006.01)
*C09J 133/06* (2006.01)

(52) U.S. Cl.
CPC .............. *C09B 45/16* (2013.01); *C09B 45/20* (2013.01); *C09J 11/06* (2013.01); *C09J 133/066* (2013.01); *C09J 2203/326* (2013.01); *C09J 2301/408* (2020.08)

(58) Field of Classification Search
CPC . C07B 45/16; C07B 45/20; C09J 11/06; C09J 133/066
See application file for complete search history.

(56) References Cited

U.S. PATENT DOCUMENTS

| 7,935,475 B2* | 5/2011 | Seo ................. G02B 5/223 549/3 |
| 8,679,725 B2 | 3/2014 | Seo et al. |
| 2009/0137800 A1 | 5/2009 | Yanagisawa |
| 2010/0285293 A1 | 11/2010 | Lee et al. |
| 2011/0204303 A1 | 8/2011 | Seo et al. |
| 2015/0004424 A1 | 1/2015 | Kruesemann et al. |
| 2017/0363891 A1 | 12/2017 | Miyachi et al. |

FOREIGN PATENT DOCUMENTS

| CN | 103370642 A | 10/2013 |
| CN | 103827231 A | 5/2014 |
| CN | 107699187 A | 2/2018 |
| CN | 109825847 A | 5/2019 |
| JP | 2007-119722 A | 5/2007 |
| JP | 4351376 B2 | 10/2009 |
| JP | 2010-170116 A | 8/2010 |
| JP | 2011-512422 A | 4/2011 |
| KR | 10-2004-0049280 A | 6/2004 |
| KR | 10-0705927 B1 | 4/2007 |
| KR | 10-0714734 B1 | 5/2007 |
| KR | 10-2009-0006850 A | 1/2009 |
| KR | 10-2009-0076846 A | 7/2009 |
| KR | 10-1642555 B1 | 7/2016 |
| KR | 10-1995928 B1 | 7/2019 |
| TW | 201502211 A | 1/2015 |

OTHER PUBLICATIONS

Japanese Office Action issued for Japanese Patent Application No. 2021-570143 dated Jan. 10, 2023 with English translation , 7 pages.
International Search Report and Written Opinion issued for International Application No. PCT/KR2021/002065 dated Jun. 11, 2021, 9 page.

* cited by examiner

*Primary Examiner* — Kamal A Saeed
(74) *Attorney, Agent, or Firm* — ROTHWELL, FIGG, ERNST & MANBECK, P.C.

(57) ABSTRACT

The present application relates to an adhesive composition, an adhesive film, an adhesive optical filter and a display device.

20 Claims, 3 Drawing Sheets

[FIG. 1]
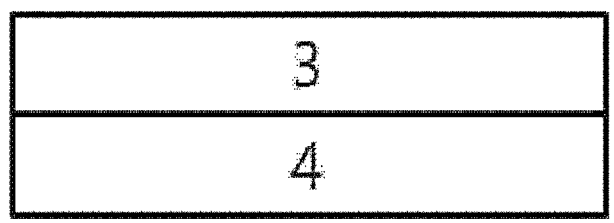
[FIG. 2]
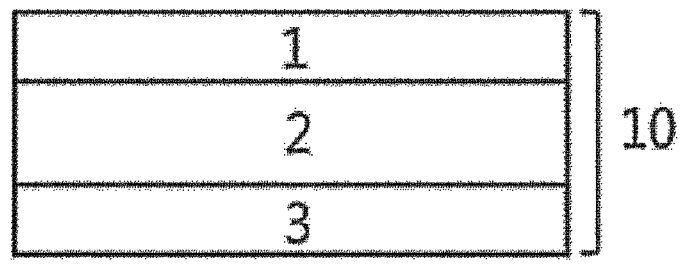
[FIG. 3]
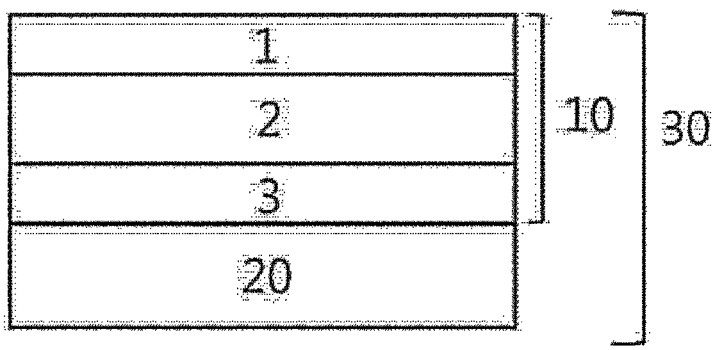

【FIG. 4】
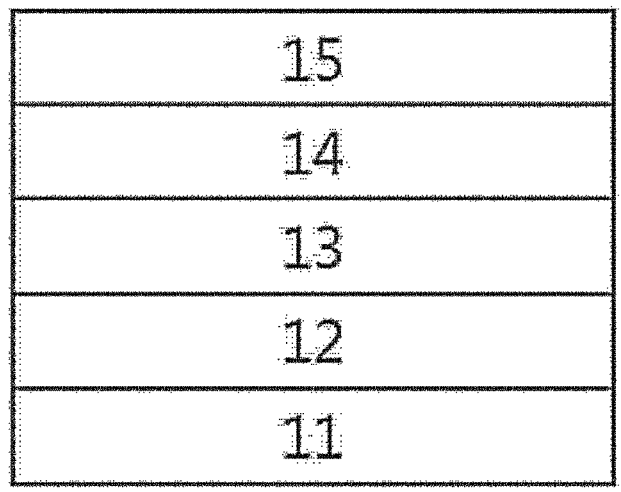
【FIG. 5】
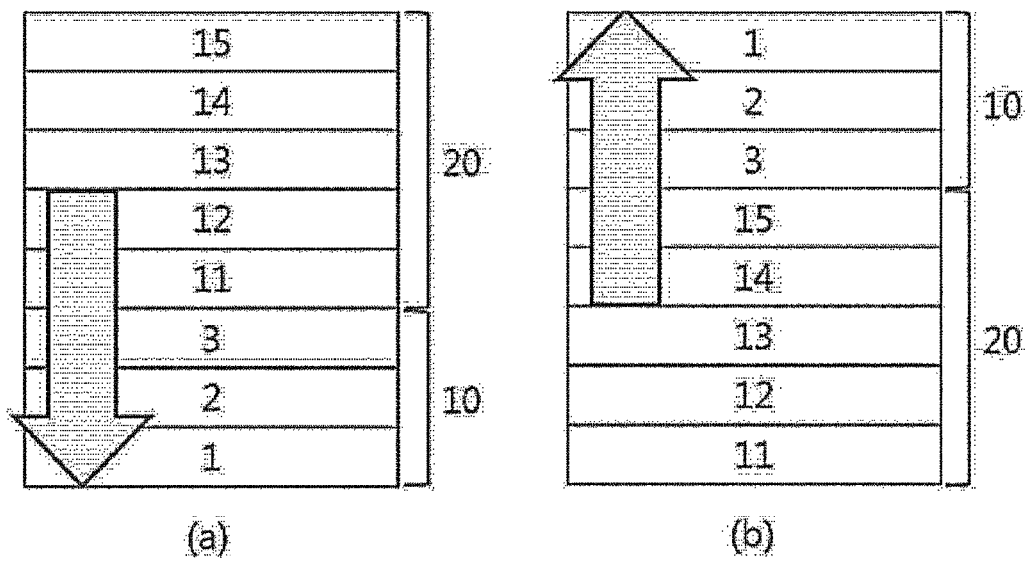

[FIG. 6]

|  15  |
|------|
|  14  |
|  13  |
|  12  |
| R  G  B  ] 16 |

(a)

| R  G  B  ] 16 |
|------|
|  14  |
|  13  |
|  12  |
|  11  |

(b)

2

ADHESIVE COMPOSITION, ADHESIVE FILM, ADHESIVE OPTICAL FILTER AND DISPLAY DEVICE

This application is a 35 U.S.C. 371 National Phase Entry Application from PCT/KR2021/002065, filed on Feb. 18, 2021, which claims priority to and the benefits of Korean Patent Application No. 10-2020-0021095, filed with the Korean Intellectual Property Office on Feb. 20, 2020, the entire contents of which are incorporated herein by reference.

TECHNICAL FIELD

The present specification relates to an adhesive composition, an adhesive film, an adhesive optical filter and a display device.

BACKGROUND OF THE INVENTION

Organic light emitting diodes express colors in various ways, and a method of forming each color material of blue, green and red as a film under vacuum to divide pixels for each of the colors, a method of introducing each color filter for color conversion to a light emitting layer emitting blue to develop colors, a method of introducing each color filter to a diode emitting white to express blue, green and red, and the like, have been used.

Azo-based metal complex dyes have high solubility for organic solvents resulting in excellent processability, show excellent light resistance reliability, and have high compatibility with most resins, and have been used in a wide variety of applications in the field of display.

However, contrary to what is widely known, azo-metal complex dyes do not have full light resistance reliability, and therefore, additional efforts for improvements have been required to improve light resistance.

BRIEF SUMMARY OF THE INVENTION

The present specification is directed to providing an adhesive composition, an adhesive film, an adhesive optical filter and a display device.

One embodiment of the present specification provides an adhesive composition including an acryl-based adhesive resin; an azo-based metal complex dye; and a compound having a functional group represented by the following Chemical Formula 1.

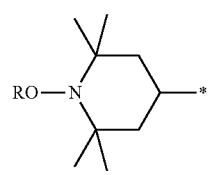

[Chemical Formula 1]

In Chemical Formula 1,

*— means a site bonding to other substituents or bonding sites, and

R is a substituted or unsubstituted alkyl group.

Another embodiment of the present specification provides an adhesive film including the adhesive composition described above or a cured material thereof.

Another embodiment of the present specification provides an adhesive film including an acryl-based adhesive resin; an azo-based metal complex dye; and a compound having a functional group represented by the following Chemical Formula 1.

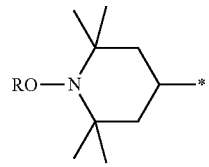

[Chemical Formula 1]

In Chemical Formula 1,

*— means a site bonding to other substituents or bonding sites, and

R is a substituted or unsubstituted alkyl group.

Another embodiment of the present specification provides an adhesive optical filter including the adhesive film; and an anti-reflection film provided on one surface of the adhesive film.

Another embodiment of the present specification provides a display device including the adhesive optical filter described above.

An adhesive composition according to one embodiment of the present specification has a low haze value, and has high light resistance reliability.

BRIEF DESCRIPTION OF DRAWINGS

FIG. 1 illustrates a structure of an adhesive film including a release layer provided on one surface of an adhesive film according to one embodiment of the present specification.

FIG. 2 illustrates a structure of an adhesive optical filter according to one embodiment of the present specification.

FIG. 3 illustrates a structure of an OLED device, one example of a display device according to one embodiment of the present specification.

FIG. 4 illustrates a structure of an OLED panel according to one embodiment of the present specification.

FIG. 5 illustrates an OLED device having a bottom emission structure and an OLED device having a top emission structure according to the present specification.

FIG. 6 illustrates a structure of an OLED panel provided with a color filter-formed substrate according to the present specification.

REFERENCE NUMERAL

1: Anti-Reflection Film
2: Base Material
3: Adhesive Film
4: Release Layer
10: Adhesive Optical Filter
11: Substrate
12: Lower Electrode
13: Organic Material Layer
14: Upper Electrode
15: Encapsulation Substrate
16: Color Filter-Formed Substrate

20: OLED Panel
30: OLED Device

DETAILED DESCRIPTION OF THE INVENTION

Hereinafter, the present specification will be described in more detail.

In the present specification, a description of a certain part "including" certain constituents means capable of further including other constituents, and does not exclude other constituents unless particularly stated on the contrary.

One embodiment of the present specification provides an adhesive composition including an acryl-based adhesive resin; an azo-based metal complex dye; and a compound having a functional group represented by the following Chemical Formula 1.

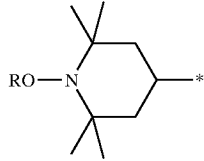

[Chemical Formula 1]

In Chemical Formula 1,

*— means a site bonding to other substituents or bonding sites, and

R is a substituted or unsubstituted alkyl group.

In the present specification, a complex is also referred to as a complex compound, and means a compound formed through a coordination bond of an electron lone pair of a ligand to a central metal ion having many empty orbitals.

An organic light emitting diode (OLED) panel generally has high reflectance due to properties of having a reflective electrode essentially formed therein. One way to lower reflectance of an OLED panel is to use an optical film incorporating a dye that absorbs visible light. In order to use an optical film in display applications, high light resistance reliability needs to be secured first, and in order to obtain a high level of contrast ratio, the optical film needs to have a low haze value. The present disclosure is directed to improving light resistance reliability of an optical film using an azo-based metal complex dye, and providing excellent optical properties.

When using the adhesive composition according to one embodiment of the present specification in an OLED device, external light reflection may be efficiently suppressed without using a circular polarizing plate. Not using a circular polarizing plate in an OLED device has advantages of saving material costs, and properly maintaining flexibility of the OLED device.

In addition, by the present specification providing a black color adhesive film incorporating an organic dye capable of absorbing visible light, an OLED device including the adhesive film may suppress high panel reflectance.

External light reflection of an OLED device may be efficiently suppressed as transmittance of an adhesive film decreases. However, when transmittance of an adhesive film excessively decreases, luminance of an OLED panel may decrease as well. However, when using the adhesive composition according to the present specification in an OLED device, transmittance of 40% to 90% is properly maintained while efficiently suppressing external light reflection, and as a result, luminance of the OLED panel may be excellently maintained.

In the present specification, external light reflectance (Rc) of an OLED device may be calculated by the following equation.

$$Rc = Rs + \left(1 - \frac{Rs}{100}\right) \times (Rp - 4) \times \left(\frac{T}{100}\right)^2 \qquad \text{[Equation]}$$

In the equation,

Rs is reflectance (%) of an anti-reflection film for light with a wavelength of 550 nm, Rp is reflectance (%) of an OLED panel for light with a wavelength of 550 nm, and T is total transmittance (%) of the adhesive film and the anti-reflection film for light with a wavelength of 550 nm.

The reflectance of the anti-reflection film may be measured using a CM-2600d color difference meter of Konica Minolta, Inc. after conducting blackening treatment or attaching a black tape on a surface opposite to the anti-reflection film to remove an effect of reflection at the interface of the surface opposite to the anti-reflection film. A reflectance value including specular reflectance (SCI) may be obtained under a condition of a measuring diameter radius of 3 mm.

Reflectance of the OLED panel may be measured using the same equipment and under the same condition used to measure reflectance of the anti-reflection film. However, a separate blackening treatment is not conducted on the opposite surface of the emitting surface of the OLED panel.

In addition, the total transmittance of the adhesive film and the anti-reflection film may be measured using a transmittance measuring device (spectrometer) commonly used in the art.

When using the adhesive composition including an azo-based metal complex dye and a hindered amine light stabilizer (HALS: hereinafter, referred to as HALS) that is the compound having the functional group represented by Chemical Formula 1 in the present disclosure, light resistance reliability of the film may be greatly enhanced without reducing a crosslinking rate in the adhesive, and haze is not caused. However, a combined use of an azo-based metal complex dye and a general HALS may cause side effects. Specifically, haze of an adhesive film may increase, and a crosslinking rate of an adhesive resin included in an adhesive composition may be reduced.

The hindered amine light stabilizer may be classified into an NR type and an NOR type in the art. The NR type means a compound having a functional group in which an alkyl group directly bonds to N of 2,2,6,6-tetramethylpiperidinyl group. The NOR type means a compound having a functional group in which an alkoxy group directly bonds to N of 2,2,6,6-tetramethylpiperidinyl group.

In the present specification, the compound having the functional group represented by Chemical Formula 1 may be referred to as the NOR type.

Specifically, compared to the compound having the functional group represented by Chemical Formula 1, the NR type HALS forms a salt from an acid-base reaction between its tertiary amine group and an azo-based metal complex dye, which results in a significant occurrence of haze in a film.

In addition, due to a hydrogen bonding reaction between a tertiary amine group of the NR type HALS and a crosslinking site in an acryl-based adhesive resin, a crosslinking reaction of the acryl-based adhesive resin may be suppressed, and such crosslinking suppression may cause a phenomenon of worsening creep properties of an adhesive film.

The NR-type HALS may be, for example, represented by the following Chemical Formula N.

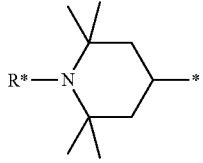

[Chemical Formula N]

In Chemical Formula N,

•— means a site bonding to other substituents or bonding sites, and

R* is hydrogen; or a substituted or unsubstituted alkyl group.

However, the NOR type HALS that is the compound having the functional group represented by Chemical Formula 1 according to the present specification has low reactivity, that is, very low basicity, compared to the NR type HALS, and therefore, may be used in an adhesive composition including an azo-based metal complex dye without the side effects described above.

In one embodiment of the present specification, R is a substituted or unsubstituted alkyl group having 1 to 30 carbon atoms.

In one embodiment of the present specification, R is a substituted or unsubstituted alkyl group having 1 to 20 carbon atoms.

In one embodiment of the present specification, R is a substituted or unsubstituted alkyl group having 1 to 10 carbon atoms.

In one embodiment of the present specification, R is a substituted or unsubstituted alkyl group having 6 to 10 carbon atoms.

In one embodiment of the present specification, R is a substituted or unsubstituted octyl group.

In one embodiment of the present specification, R is an octyl group.

In one embodiment of the present specification, the compound having the functional group represented by Chemical Formula 1 may be represented by the following Chemical Formula 1-1.

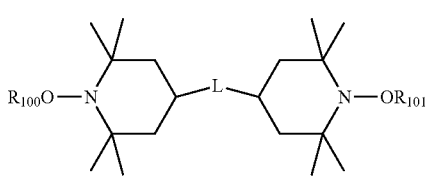

[Chemical Formula 1-1]

In Chemical Formula 1-1, $R_{100}$ and $R_{101}$ are the same as or different from each other, and each independently a substituted or unsubstituted alkyl group, L is —OCO-L'-COO—, and L' is a substituted or unsubstituted alkylene group.

In one embodiment of the present specification, $R_{100}$ and $R_{101}$ are the same as or different from each other, and each independently a substituted or unsubstituted alkyl group having 1 to 30 carbon atoms.

In one embodiment of the present specification, $R_{100}$ and $R_{101}$ are the same as or different from each other, and each independently a substituted or unsubstituted alkyl group having 1 to 20 carbon atoms.

In one embodiment of the present specification, $R_{100}$ and $R_{101}$ are the same as or different from each other, and each independently a substituted or unsubstituted alkyl group having 1 to 10 carbon atoms.

In one embodiment of the present specification, $R_{100}$ and $R_{101}$ are the same as or different from each other, and each independently a substituted or unsubstituted alkyl group having 6 to 10 carbon atoms.

In one embodiment of the present specification, $R_{100}$ and $R_{101}$ are the same as or different from each other, and each independently a substituted or unsubstituted octyl group.

In one embodiment of the present specification, $R_{100}$ and $R_{101}$ are an octyl group.

In one embodiment of the present specification, L' is a substituted or unsubstituted alkylene group having 1 to 30 carbon atoms.

In one embodiment of the present specification, L' is a substituted or unsubstituted alkylene group having 1 to 20 carbon atoms.

In one embodiment of the present specification, L' is a substituted or unsubstituted alkylene group having 1 to 10 carbon atoms.

In one embodiment of the present specification, L' is a substituted or unsubstituted octylene group.

In one embodiment of the present specification, L' is an octylene group.

In one embodiment of the present specification, the azo-based metal complex dye is a compound represented by the following Chemical Formula A or Chemical Formula B.

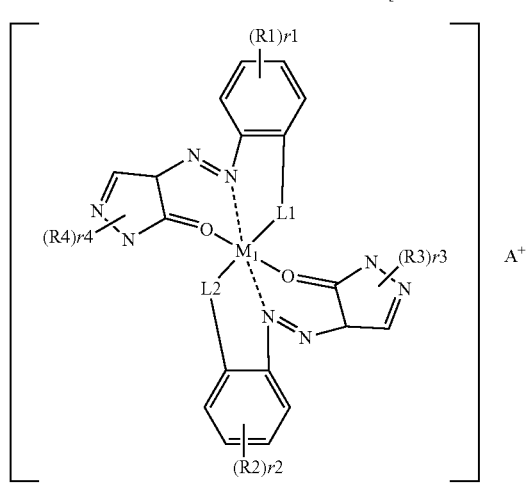

[Chemical Formula A]

[Chemical Formula B]

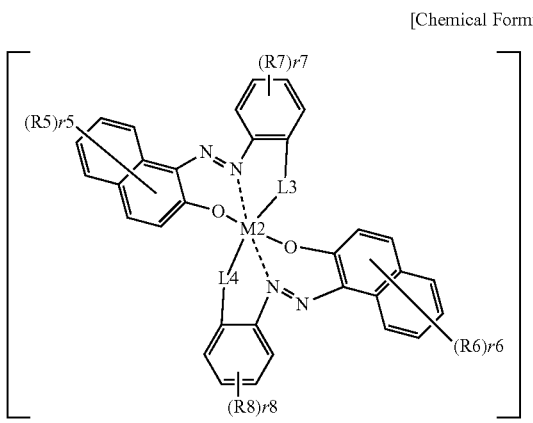

[Chemical Formula C]

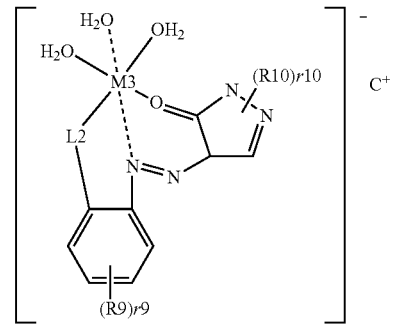

In Chemical Formulae A and B,

L1 to L4 are the same as or different from each other, and each independently —O—; or —COO—, R1 to R8 are the same as or different from each other, and each independently hydrogen; a halogen group; a substituted or unsubstituted alkyl group; a substituted or unsubstituted aryl group; —NO$_2$; —SO$_3$R'; —SO$_2$R''; or —NHCOR''', R', R'' and R''' are the same as or different from each other, and each independently hydrogen; or a substituted or unsubstituted alkyl group, r1 is an integer of 1 to 4, and when r1 is 2 or greater, R1s are the same as or different from each other, r2 is an integer of 1 to 4, and when r2 is 2 or greater, R2s are the same as or different from each other, r3 is an integer of 1 to 3, and when r3 is 2 or greater, R3s are the same as or different from each other, r4 is an integer of 1 to 3, and when r4 is 2 or greater, R4s are the same as or different from each other, r5 is an integer of 1 to 6, and when r5 is 2 or greater, R5s are the same as or different from each other, r6 is an integer of 1 to 6, and when r6 is 2 or greater, R6s are the same as or different from each other, r7 is an integer of 1 to 4, and when r7 is 2 or greater, R7s are the same as or different from each other, r8 is an integer of 1 to 4, and when r8 is 2 or greater, R8s are the same as or different from each other, M1 and M2 are the same as or different from each other, and each independently Cr$^{3+}$; or Co$^{3+}$, and A and B are the same as or different from each other, and each independently hydrogen; an alkali metal; NH$_4$; a substituted or unsubstituted alkylammonium; or a substituted or unsubstituted cycloalkylammonium.

In one embodiment of the present specification, the azo-based metal complex dye further includes a compound represented by the following Chemical Formula C.

In Chemical Formula C,

L2 is —O—; or —COO—,

R9 and R10 are the same as or different from each other, and each independently hydrogen; a substituted or unsubstituted alkyl group; a substituted or unsubstituted aryl group; —NO$_2$; or —SO$_3$R', R' is hydrogen; or a substituted or unsubstituted alkyl group, r9 is an integer of 1 to 4, and when r9 is 2 or greater, R9s are the same as or different from each other, r10 is an integer of 1 to 3, and when r10 is 2 or greater, R10s are the same as or different from each other, M3 is Cr$^+$, and C is hydrogen; an alkali metal; NH$_4$; a substituted or unsubstituted alkylammonium; or a substituted or unsubstituted cycloalkylammonium.

H$_2$O substituted in M3 means that the dye formed with Chemical Formula C may be a hydrated product, and the shape of substitution may vary depending on the surrounding environment. Moisture (H$_2$O) may be adsorbed when exposed to the atmosphere, and in a solvent, substitution by the solvent may occur.

In the present specification, the "azo-based metal complex dye further includes a compound represented by the following Chemical Formula C" may mean that the azo-based metal complex dye includes only the compound represented by Chemical Formula A, or includes only the compound represented by Chemical Formula B. In addition, it may mean that the azo-based metal complex dye includes the compound represented by Chemical Formula A and the compound represented by Chemical Formula C, or includes the compound represented by Chemical Formula B and the compound represented by Chemical Formula C.

In one embodiment of the present specification, when the azo-based metal complex dye includes the compound represented by Chemical Formula A and the compound represented by Chemical Formula C, the compound represented by Chemical Formula A may be included in 94 parts by weight to 96 parts by weight, and the compound represented by Chemical Formula C may be included in 4 parts by weight to 6 parts by weight in the azo-based metal complex dye based on the total weight of 100 parts by weight of the azo-based metal complex dye, however, the content is not limited thereto.

In one embodiment of the present specification, L1 to L4 are the same as or different from each other, and each independently —O—; or —COO—.

In one embodiment of the present specification, L1 and L2 are —O—.

In one embodiment of the present specification, L1 and L2 are —COO—.

In one embodiment of the present specification, L3 and L4 are —O—.

In one embodiment of the present specification, L3 and L4 are —COO—.

In one embodiment of the present specification, R1 to R8 are the same as or different from each other, and each independently hydrogen; a halogen group; a substituted or unsubstituted alkyl group having 1 to 30 carbon atoms; a substituted or unsubstituted aryl group having 6 to 30 carbon atoms; —$NO_2$; —$SO_3R'$; —$SO_2R''$; or —NHCOR'''.

In one embodiment of the present specification, R1 to R8 are the same as or different from each other, and each independently hydrogen; a halogen group; a substituted or unsubstituted alkyl group having 1 to 20 carbon atoms; a substituted or unsubstituted aryl group having 6 to 20 carbon atoms; —$NO_2$; —$SO_3R'$; —$SO_2R''$; or —NHCOR'''.

In one embodiment of the present specification, R1 to R8 are the same as or different from each other, and each independently hydrogen; a halogen group; a substituted or unsubstituted alkyl group having 1 to 10 carbon atoms; a substituted or unsubstituted aryl group having 6 to 12 carbon atoms; —$NO_2$; —$SO_3R'$; —$SO_2R''$; or —NHCOR'''.

In one embodiment of the present specification, R1 to R8 are the same as or different from each other, and each independently hydrogen; a halogen group; a substituted or unsubstituted methyl group; a substituted or unsubstituted pentyl group; a substituted or unsubstituted phenyl group; —$NO_2$; —$SO_3R'$; —$SO_2R''$; or —NHCOR'''.

In one embodiment of the present specification, R1 to R8 are the same as or different from each other, and each independently hydrogen; a halogen group; a methyl group; a tert-pentyl group; a phenyl group unsubstituted or substituted with a halogen group; —$NO_2$; —$SO_3R'$; —$SO_2R''$; or —NHCOR'''.

In one embodiment of the present specification, R1 to R4 are the same as or different from each other, and each independently hydrogen; a halogen group; a methyl group; —$NO_2$; —$SO_3R'$; or —$SO_2R''$.

In one embodiment of the present specification, R5 to R8 are the same as or different from each other, and each independently hydrogen; a halogen group; a methyl group; a tert-pentyl group; a phenyl group; —$NO_2$; —$SO_3R'$; —$SO_2R''$; or —NHCOR'''.

In one embodiment of the present specification, R', R" and R''' are the same as or different from each other, and each independently hydrogen; or a substituted or unsubstituted alkyl group having 1 to 30 carbon atoms.

In one embodiment of the present specification, R', R" and R''' are the same as or different from each other, and each independently hydrogen; or a substituted or unsubstituted alkyl group having 1 to 20 carbon atoms.

In one embodiment of the present specification, R', R" and R''' are the same as or different from each other, and each independently hydrogen; or a substituted or unsubstituted alkyl group having 1 to 10 carbon atoms.

In one embodiment of the present specification, R', R" and R''' are the same as or different from each other, and each independently hydrogen; or a substituted or unsubstituted methyl group.

In one embodiment of the present specification, M1 is $Cr^{3+}$.

In one embodiment of the present specification, M1 is $Co^{3+}$.

In one embodiment of the present specification, M2 is $Cr^{3+}$.

In one embodiment of the present specification, M2 is $Co^{3+}$.

In one embodiment of the present specification, A and B are the same as or different from each other, and each independently hydrogen; an alkali metal; $NH_4$; a substituted or unsubstituted alkylammonium having 1 to 30 carbon atoms; or a substituted or unsubstituted cycloalkylammonium having 3 to 30 carbon atoms.

In one embodiment of the present specification, A and B are the same as or different from each other, and each independently hydrogen; an alkali metal; $NH_4$; a substituted or unsubstituted alkylammonium having 1 to 20 carbon atoms; or a substituted or unsubstituted cycloalkylammonium having 3 to 20 carbon atoms.

In one embodiment of the present specification, A is hydrogen; Na; $NH_4$; or a substituted or unsubstituted alkylammonium having 12 to 14 carbon atoms.

In one embodiment of the present specification, A is hydrogen.

In one embodiment of the present specification, A is Na.

In one embodiment of the present specification, A is an alkylammonium having 12 to 14 carbon atoms.

In one embodiment of the present specification, B is hydrogen; Na; a substituted or unsubstituted alkylammonium having 12 to 14 carbon atoms; or a substituted or unsubstituted cycloalkylammonium having 6 to 12 carbon atoms.

In one embodiment of the present specification, B is hydrogen.

In one embodiment of the present specification, B is Na.

In one embodiment of the present specification, B is an alkylammonium having 12 to 14 carbon atoms.

In one embodiment of the present specification, B is a cycloalkylammonium having 6 to 12 carbon atoms.

In one embodiment of the present specification, Chemical Formula C may be represented by the following chemical formula, but is not limited thereto.

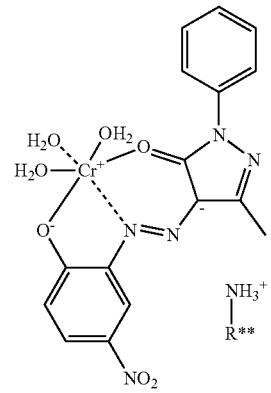

In the chemical formula,

R** means a substituted or unsubstituted alkyl group having 12 to 14 carbon atoms.

As another example, R** in the chemical formula means an alkyl group having 12 to 14 carbon atoms.

In one embodiment of the present specification, Chemical Formula A may be represented by, for example, the following chemical formulae, but is not limited thereto.

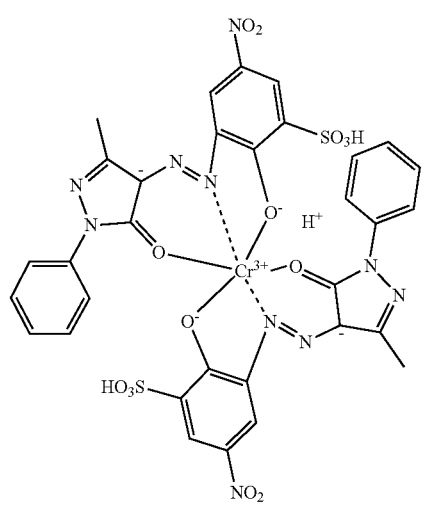
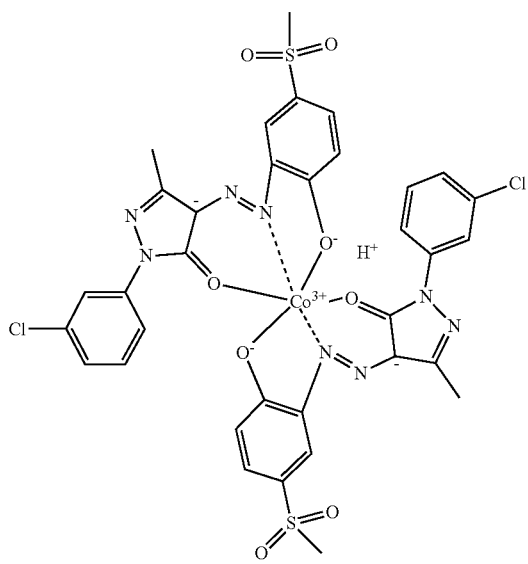
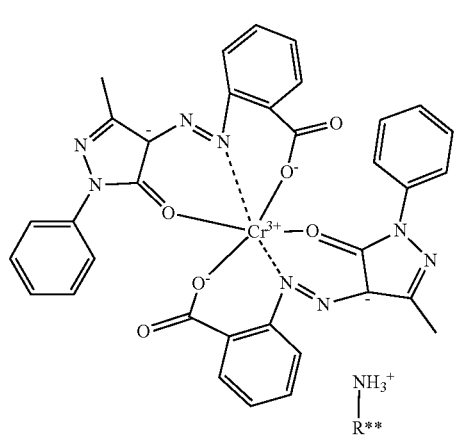
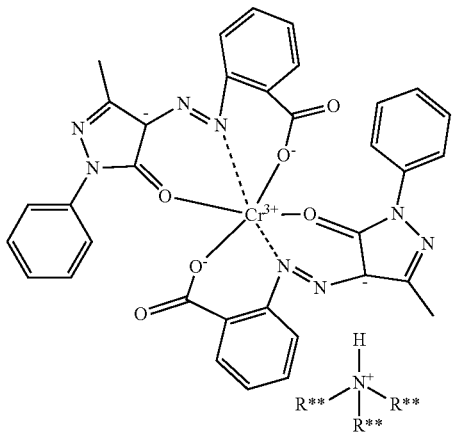
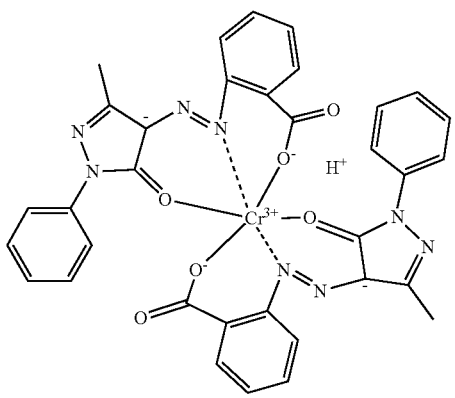
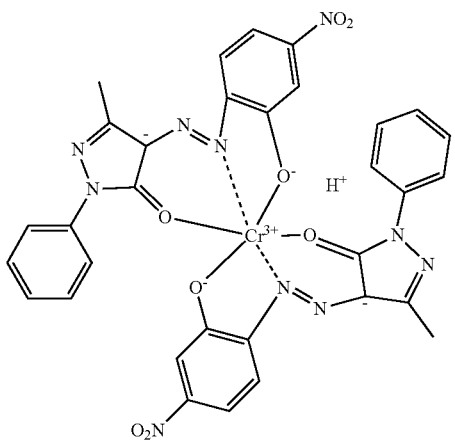

-continued

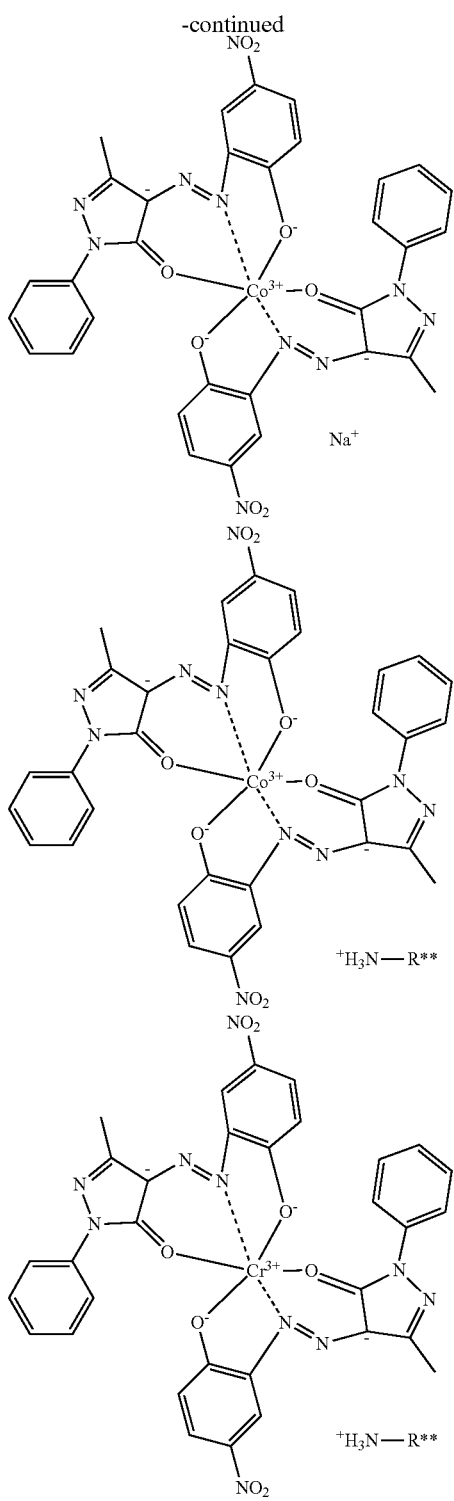

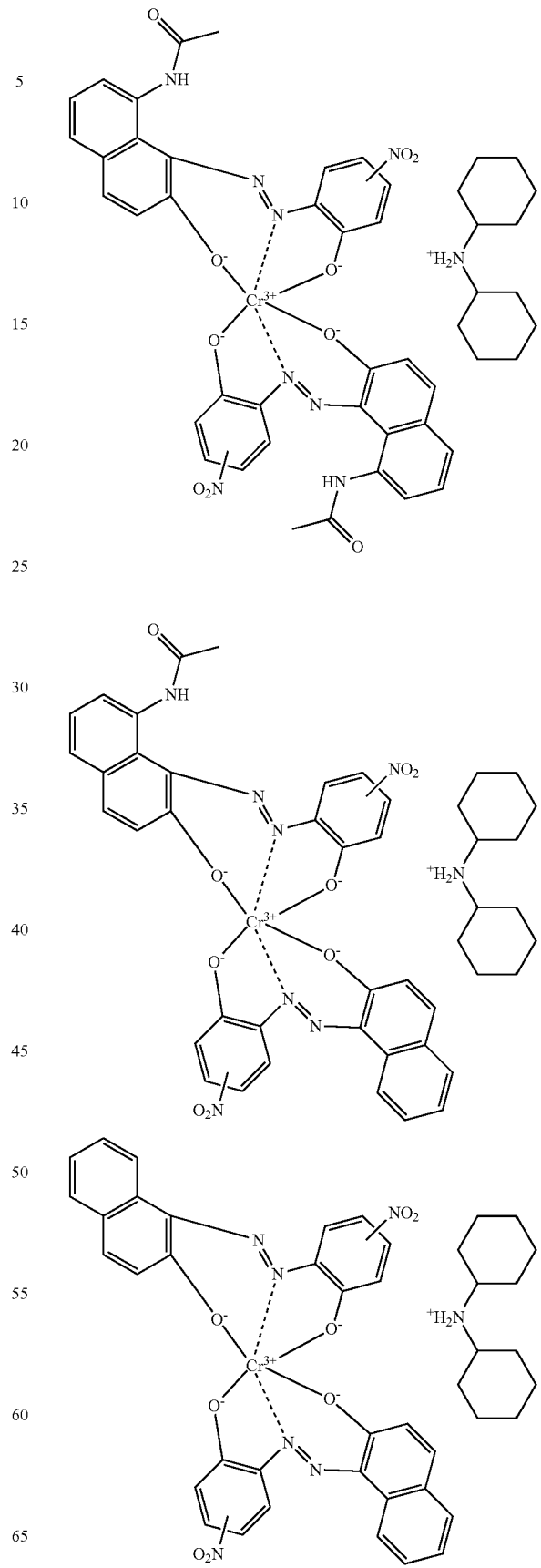

In the chemical formulae,

R** means a substituted or unsubstituted alkyl group having 12 to 14 carbon atoms.

As another example, R** in the chemical formulae means an alkyl group having 12 to 14 carbon atoms.

In one embodiment of the present specification, Chemical Formula B may be represented by, for example, the following chemical formulae, but is not limited thereto.

-continued

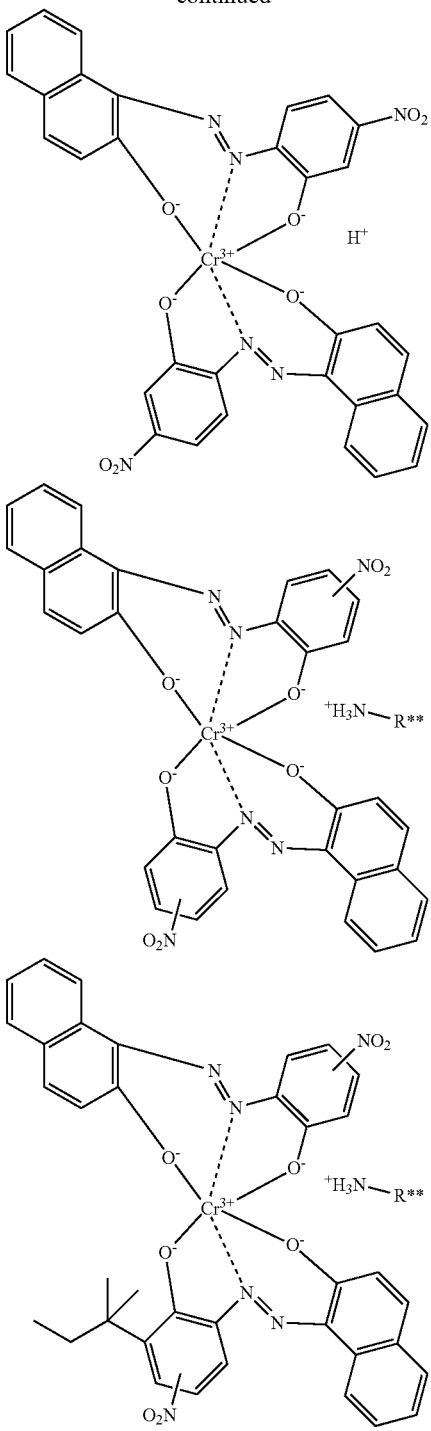

In the chemical formulae,

R** means a substituted or unsubstituted alkyl group having 12 to 14 carbon atoms.

As another example, R** in the chemical formulae means an alkyl group having 12 to 14 carbon atoms.

In the present specification, the azo-based metal complex dye may mean one compound of the dye structures described above, and may include two or more compounds thereof. In addition, isomers of the azo-based metal complex dye described above may also be included.

In one embodiment of the present specification, the compound having the functional group represented by Chemical Formula 1 has a molecular weight of 700 g/mol to 750 g/mol.

Specifically, the compound having the functional group represented by Chemical Formula 1 has a molecular weight of 730 g/mol to 740 g/mol. More specifically, the molecular weight is from 735 g/mol to 738 g/mol.

The molecular weight may be calculated from the elemental composition of the compound.

When the molecular weight of the compound having the functional group represented by Chemical Formula 1 satisfies the range described above, excellent solubility is obtained, and when using the adhesive composition in an OLED device, effects aimed in the present specification may be properly obtained.

In the present specification, examples of substituents are described below, however, the substituents are not limited thereto.

The term "substitution" means a hydrogen atom bonding to a carbon atom of a compound being changed to another substituent, and the position of substitution is not limited as long as it is a position at which the hydrogen atom is substituted, that is, a position at which a substituent can substitute, and when two or more substituents substitute, the two or more substituents may be the same as or different from each other.

In the present specification, the term "substituted or unsubstituted" means being substituted with one, two or more substituents selected from the group consisting of deuterium; a halogen group; an aryl group; an alkyl group; and an alkoxy group, or being substituted with a substituent linking two or more substituents among the substituents illustrated above, or having no substituents.

Examples of the substituents are described below, however, the substituents are not limited thereto.

In the present specification, the alkali metal means a chemical element other than hydrogen in Group 1 of the periodic table, and examples thereof may include lithium, sodium, potassium, rubidium, cesium or francium.

In the present specification, examples of the halogen group may include fluorine, chlorine, bromine or iodine.

In the present specification, the aryl group is not particularly limited, but preferably has 6 to 60 carbon atoms, and may be a monocyclic aryl group or a polycyclic aryl group. According to one embodiment, the aryl group has 6 to 30 carbon atoms.

In the present specification, the heteroaryl group includes S, O, Se, N or Si as a heteroatom, includes monocyclic or polycyclic with 2 to 60 carbon atoms, and may be further substituted by other substituents. According to one embodiment, the heteroaryl group has 2 to 30 carbon atoms.

In the present specification, the alkyl group may be linear or branched, and although not particularly limited thereto, the number of carbon atoms is preferably from 1 to 60. According to one embodiment, the alkyl group has 1 to 30 carbon atoms.

In the present specification, the descriptions on the alkyl group provided above are applied to alkyl in an alkylamine group. Specific examples of the alkylamine group may include a methylamine group, a dimethylamine group, an ethylamine group or a diethylamine group, but is not limited thereto.

The azo-based metal complex dye may be used either alone or as a mixture of two or more types. In addition, the azo-based metal complex dye may be used in combination with dyes such as (mono or di)azo-based, anthraquinonebased, methine-based, cyanine-based, squarylium-based, (benzo)triazole-based, triazine-based, (aza)porphyrine-based and phthalocyanine-based.

Securing light resistance reliability is very important for an adhesive composition using an organic dye. Organic dyes generally have absorption in visible light, and therefore, degradation of the dyes may occur at a wavelength of visible light and an ultraviolet (UV) wavelength having relatively high energy.

In one embodiment of the present specification, the adhesive composition includes at least one selected from the group consisting of an antistatic agent, a crosslinking agent, an antioxidant, a tin-based catalyst and a coupling agent.

The at least one selected from the group consisting of an antistatic agent, a crosslinking agent, an antioxidant, a tin-based catalyst and a coupling agent may be included in 0.01 parts by weight to 2 parts by weight in the adhesive composition based on the total weight of 100 parts by weight of the acryl-based adhesive resin.

A general acryl-based adhesive resin is normally used in the adhesive composition according to the present specification, and in order to control modulus for maintaining proper adhesion performance, the crosslinking agent or the coupling agent may be further included in addition to the acryl-based adhesive resin. The antistatic agent may be further included to prevent static electricity.

As the acryl-based adhesive resin, copolymers formed with two or more types of monomers selected from among, for example, methyl (meth)acrylate, ethyl (meth)acrylate, butyl (meth)acrylate, ethylhexyl (meth)acrylate, hydroxyethyl (meth)acrylate, (meth)acrylic acid and dimethylaminoethyl (meth)acrylate may be used, however, the acryl-based adhesive resin is not limited thereto.

The antistatic agent reduces electrical resistivity of the adhesive film surface, and thereby may induce a more superior release of surface charges formed through friction during the process of manufacturing or using the adhesive film.

Accordingly, the antistatic agent performs a role of maintaining excellent quality of a produced optical sheet by improving defects caused by particles in an actual mass production using the principle of less electrostatically attracting dust particles. In addition, the antistatic agent minimizes generation of static electricity when attached to a display panel, and thereby suppresses defects in the panel caused by the static electricity. For such reasons, using an antistatic agent is commonly recognized as essential in the art when manufacturing a sheet including an adhesive.

Particularly, when the azo-based metal complex dye is included in the adhesive composition according to the present specification, the antistatic agent may be further included therein to secure excellent light resistance reliability.

The crosslinking agent may be an isocyanate-based crosslinking agent.

Examples of the isocyanate-based crosslinking agent may include tolylene diisocyanate, xylene diisocyanate, 2,4-diphenyl methane diisocyanate, 4,4-diphenyl methane diisocyanate, hexamethylene diisocyanate, isophorone diisocyanate, tetramethylxylene diisocyanate, naphthalene diisocyanate, triphenylmethane triisocyanate, methylenebis triisocyanate and the like, but are not limited thereto.

The coupling agent may be a silane-based coupling agent.

As the tin-based catalyst and the antioxidant, those known in the art may be properly employed.

The adhesive composition may further include methyl ethyl ketone as a solvent, however, the solvent is not limited thereto. The solvent may be further included in 80 parts by weight to 90 parts by weight in the adhesive composition.

In one embodiment of the present specification, the adhesive composition includes the acryl-based adhesive resin in 10 parts by weight to 30 parts by weight, the azo-based metal complex dye in 0.01 parts by weight to 5 parts by weight, and the compound having the functional group represented by Chemical Formula 1 in 0.1 parts by weight to 10 parts by weight.

In the present specification, the parts by weight of each constituent included in the adhesive composition may be based on the total weight of the adhesive composition as 100 parts by weight.

The content of the azo-based metal complex dye may be adjusted to obtain an optical film having target transmittance according to the intended use, and when using in less than 0.01 parts by weight, the effect of using the dye is difficult to obtain. It is preferred not to exceed a maximum of 5 parts by weight, and this is due to the fact that precipitates of the dye may occur in the adhesive when the content of the dye is too excessive.

When using the compound represented by Chemical Formula 1 in less than 0.1 parts by weight, the effect of light resistance reliability is difficult to obtain, and the content of greater than 10 parts by weight may cause surface migration of the additives.

In one embodiment of the present specification, the adhesive film may include the adhesive composition according to one embodiment of the present specification as it is.

In one embodiment of the present specification, the adhesive film may include a cured material of the adhesive composition according to one embodiment of the present specification.

In the present specification, the cured material is obtained by curing after the solvent included in the adhesive composition is dried, and each constituent included in the adhesive composition is crosslinked by forming chemical and/or physical bonds.

One embodiment of the present specification provides an adhesive film including an acryl-based adhesive resin;
an azo-based metal complex dye; and
a compound having a functional group represented by the following Chemical Formula 1.

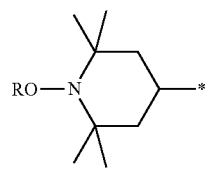

[Chemical Formula 1]

In Chemical Formula 1,
*— means a site bonding to other substituents or bonding sites, and
R is a substituted or unsubstituted alkyl group.

Each substituent of Chemical Formula 1 has the same definition as above.

In the present specification, the adhesive film may function as an optical adhesive layer.

The function as an optical adhesive layer means forming a black color adhesive film incorporating an organic dye capable of absorbing visible light, and an OLED panel including the same suppresses high panel reflectance. In other words, visible light transmittance of the adhesive film may be controlled in a range of approximately 30% to 90%, and transmittance in a visible region may be properly adjusted depending on the panel reflectance and the reflected color.

In one embodiment of the present application, the adhesive film may have a thickness of greater than or equal to 3 μm and less than or equal to 100 μm.

In another embodiment, the adhesive film may have a thickness of greater than or equal to 3 μm and less than or equal to 100 μm, preferably greater than or equal to 5 μm and less than or equal to 80 μm, and more preferably greater than or equal to 10 μm and less than or equal to 50 μm.

In one embodiment of the present specification, the adhesive film further includes a release layer provided on one surface.

FIG. 1 illustrates a structure of the adhesive film including a release layer (4) provided on one surface of the adhesive film (3) according to one embodiment of the present specification.

In the present specification, the release layer means a transparent layer formed on one surface of the adhesive film through a release treatment, and, as long as it does not adversely affect in the manufacturing process of the adhesive film, may be employed without limit in terms of materials, thicknesses, properties and the like. The release layer provided on one surface of the adhesive film may be removed after manufacturing the adhesive film.

The release layer may include one or more selected from the group consisting of acetate-based, polyester-based, polyethersulphone-based, polycarbonate-based, polyamide-based, polyimide-based, polyolefin-based, cycloolefin-based, polyurethane-based, acryl-based, fluorine-based and silicone-based resins, but is not limited thereto.

The release layer may have a thickness of greater than or equal to 10 nm and less than or equal to 1,000 nm, preferably greater than or equal to 20 nm and less than or equal to 800 nm, and more preferably greater than or equal to 40 nm and less than or equal to 100 nm, however, the thickness is not limited thereto. In the present specification, the adhesive film may be manufactured by coating the adhesive composition described above on the release layer or a base material using a bar coater. The adhesive film may be manufactured by coating the adhesive composition described above on a base material using a bar coater, and then drying the result. Descriptions on the base material will be provided later. The methods of coating and drying are not particularly limited, and methods used in the art may be properly employed.

One embodiment of the present specification provides an adhesive optical filter including an adhesive film; and an anti-reflection film provided on one surface of the adhesive film.

In addition, one embodiment of the present specification provides an adhesive optical filter further including a base material between the adhesive film and the anti-reflection film.

FIG. 2 illustrates a structure of the adhesive optical filter according to the present specification. The adhesive optical filter (10) includes a base material (2); the adhesive film (3) provided on one surface of the base material (2); and an anti-reflection film (1) provided on a surface opposite to the surface where the base material (2) and the adhesive film (3) are in contact with each other. In one embodiment of the present application, the base material may be selected from the group consisting of PET (polyethylene terephthalate), TAC (cellulose triacetate), polyester, PC (polycarbonate), PI (polyimide), PEN (polyethylene naphthalate), PEEK (polyether ether ketone), PAR (polyarylate), PCO (polycyclic olefin), polynorbornene, PES (polyethersulphone) and COP (cycloolefin polymer).

In one embodiment of the present application, the base material may have a thickness of greater than or equal to 10 μm and less than or equal to 200 μm, preferably greater than or equal to 15 μm and less than or equal to 100 μm, and more preferably greater than or equal to 20 μm and less than or equal to 75 μm.

In addition, the base material is preferably transparent. The base material being transparent referred herein means that light transmittance of visible light (400 nm to 700 nm) is 80% or greater. When the base material has transparency in the above-mentioned range, the laminated adhesive film may be thin-filmed.

In the present specification, the anti-reflection film functions to suppress external light reflection, and those used in the art may be employed without limit. The thickness of the anti-reflection film is not particularly limited, and may be set considering the total thickness of the display device of the present specification or aiming effects. In order to suppress high panel reflectance of an OLED panel, a black color adhesive film incorporating an organic dye that absorbs visible light is formed.

Specifically, the anti-reflection film may be formed by laminating or mixing low refractive and high refractive layers in order to minimize external light reflection. This may be manufactured using a method of dry method or wet method, and the dry method is to form by laminating a plurality of thin-film layers using deposition, sputtering or the like. The wet method is normally to form a double layer using a resin with a refractive index of 1.5 or greater and a resin with a refractive index of less 1.5, and the high refractive layer with a refractive index of 1.5 or greater may be formed using a (meth)acrylate resin and the like, and as the low refractive layer with a refractive index of less 1.5, a (meth)acrylate-based resin and a fluorine-based (meth)acrylate-based resin may be used either alone or as a mixture. Herein, in order to form a layer with a lower refractive index of 1.45 or less, silica fine particles or hollow silica particles may be further included in the fluorine-based resin.

The adhesive optical filter may be manufactured by consecutively laminating an anti-reflection film provided on one surface of a base material, and then laminating the adhesive film on a surface opposite to the surface in contact with the anti-reflection film of the base material.

In addition, the adhesive optical filter may be manufactured by laminating an anti-reflection film provided on one surface of a base material, preparing the adhesive film separately, and then attaching the adhesive film on a surface opposite to the surface in contact with the anti-reflection film laminated on the base material.

The method of laminating the anti-reflection film on one surface of the base material and the method of laminating the adhesive film on a surface opposite to the surface in contact with the anti-reflection film of the base material are not particularly limited, and, for example, methods such as coating may be employed, and other methods used in the art may be properly employed.

One embodiment of the present specification provides a display device including the adhesive optical filter.

When the display device includes the adhesive film, haze is not caused, and very superior light resistance reliability is obtained.

In one embodiment of the present specification, the display device is an OLED device including an OLED panel; and the adhesive optical filter provided on one surface of the OLED panel.

In other words, the display device may be illustrated as an OLED (organic light emitting diode) device.

FIG. 3 illustrates a structure of an OLED device (30), one example of the display device according to one embodiment of the present specification. The OLED device (30) of the present specification may include an OLED panel (20) and an adhesive optical filter (10) provided on one surface of the OLED panel (20) and having the adhesive film (3), the base material (2) and the anti-reflection film (1) consecutively formed therein. Specifically, in the OLED device (30), one surface where the OLED panel (20) and the adhesive optical filter (10) are in contact with each other is a surface opposite to the surface where the adhesive film (3) and the base material (2) are in contact with each other.

In the OLED device, the descriptions provided above are applied to the adhesive optical filter.

In the present specification, the OLED panel may consecutively include a substrate, a lower electrode, an organic material layer and an upper electrode. The organic material layer may include an organic material capable of emitting light when a voltage is applied to the lower electrode and the upper electrode. Any one of the lower electrode and the upper electrode may be an anode, and the other one may be a cathode. The anode is an electrode where holes are injected, and may be made with conductive materials having high work function. The cathode is an electrode where electrons are injected, and may be made with conductive materials having low work function. As the anode, a transparent metal oxide layer such as ITO (indium tin oxide) or IZO (indium zinc oxide) having high work function may be commonly used, and as the cathode, a metal electrode having low work function may be used. An organic material layer is generally transparent, and a transparent display may be obtained when the upper electrode and the lower electrode are made to be transparent. In one example, a transparent display may be obtained when the thickness of the upper electrode or the lower electrode is employed to be very thin.

FIG. 4 illustrates of a structure of the OLED panel according to one embodiment of the present specification, and it may be identified that the OLED panel consecutively includes a substrate (11); a lower electrode (12); an organic material layer (13); and an upper electrode (14). The OLED panel may further include an encapsulation substrate (15), which functions to prevent inflow of moisture and/or oxygen from the outside, on the upper electrode.

The organic material layer may include a light emitting layer, and may further include a common layer for charge injection and transport. Specifically, the common layer for charge injection and transport may include a hole transporting layer, a hole injecting layer, an electron injecting layer and an electron transporting layer for balancing electrons and holes, but is not limited thereto.

The adhesive optical filter may be disposed on a side of the OLED panel where light emits. For example, the adhesive optical filter may be disposed on an outer side of the substrate in a bottom emission structure where light emits toward the substrate side, and the adhesive optical filter may be disposed on an outer side of the encapsulation substrate in a top emission structure where light emits toward the encapsulation substrate side.

Specifically, (a) of FIG. 5 illustrates the OLED device when the OLED panel (20) has a bottom emission structure, and in the bottom emission structure side where light emits from the organic material layer (13) toward the substrate (11) side, the adhesive optical filter (10) may be provided on a surface opposite to the surface where the substrate (11) and the lower electrode (12) are in contact with each other, and a surface opposite to the surface in contact with the base material (2) of the adhesive film (3) included in the adhesive optical filter (10) is provided in contact with the substrate (11) of the OLED panel (20).

(b) of FIG. 5 illustrates the OLED device when the OLED panel (20) has a top emission structure, and in the top emission structure where light emits from the organic material layer (13) toward the encapsulation substrate (15) side, the adhesive optical filter (10) may be provided on a surface opposite to the surface where the encapsulation substrate (15) and the upper electrode (14) are in contact with each other, and a surface opposite to the surface in contact with the base material (2) of the adhesive film (3) included in the adhesive optical filter (10) is provided in contact with the encapsulation substrate (15) of the OLED panel (20).

Although not illustrated in the drawings, the OLED panel may have a dual emission structure, and when the OLED panel has a dual emission structure, the adhesive optical filter may be provided on both outermost side surfaces of the OLED panel, and may also be provided on one outermost side surface of the OLED panel.

The adhesive optical filter may improve visibility and display performance by minimizing external light from being reflected by a reflective layer made of a metal such as an electrode and a wire of the OLED panel and coming out of the outer side of the OLED panel. The outer side of the OLED panel means an outer side of the encapsulation substrate in the top emission, and means an outer side of the substrate in the bottom emission.

In one example, the OLED panel may further include a color filter-formed substrate as necessary. The color filter means a layer formed by coating color resists of red, green and blue in a specific pattern, and, when light passes through, displaying colors through each color filter.

Figure 6:
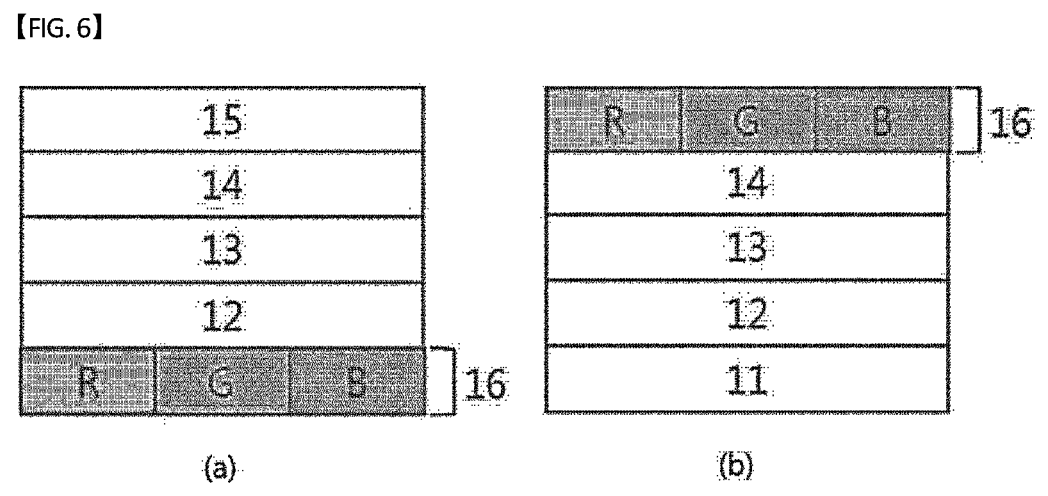

(a) of FIG. 6 illustrates a structure of the OLED panel in a bottom emission structure provided with the color filter-formed substrate (16), and the color filter-formed substrate (16) may be disposed on a surface opposite to the surface where a lower electrode (12) and an organic material layer (13) are in contact with each other. Herein, the OLED panel may have a structure consecutively including an encapsulation substrate (15), an upper electrode (14), the organic material layer (13), a metal electrode (cathode) that is the lower electrode (12) and the color filter-formed substrate (16).

(b) of FIG. 6 illustrates a structure of the OLED panel in a top emission structure provided with the color filter-formed substrate (16), and the color filter-formed substrate (16) may be disposed on a surface opposite to the surface where a transparent upper electrode (14) and an organic material layer (13) are in contact with each other. Herein, the OLED panel may have a structure consecutively including the color filter-formed substrate (16), the upper electrode (14), the organic material layer (13), a lower electrode (12) and a substrate (11). As illustrated, the color filter (16) may include red (R), green (G) and blue (B) regions, and although not separately indicated in the drawing, a black matrix for separating the regions may be further included. When a color filter is present in the OLED panel, lower panel reflectance may be obtained compared when a color filter is not present. Specifically, when a red, green and blue color filter is present in front of a light emitting layer of an OLED, high reflectance in a metal electrode located at the back surface of the light emitting layer is reduced. The panel reflectance means electrode reflection, and specifically means that external light penetrating into the OLED panel is reflected by an electrode included in the OLED panel.

The OLED panel may be employed without particular limit as long as it is used in the art, but may have average reflectance of approximately 30% to 50% in a wavelength range of 400 nm to 600 nm, and may also be an OLED panel with 25% or less. The average reflectance may be expressed as a sum of regular reflected light obtained by light from a light source entering the reflective surface and reflected at the same angle and diffused reflected light that is light scattered and reflected in various directions instead of being regular reflected due to irregularities or curves on the surface, and is expressed by averaging 400 nm to 600 nm reflectance values among the measured reflectance values for each wavelength.

Hereinafter, the present specification will be described in detail with reference to examples. However, the examples according to the present specification may be modified to various other forms, and the scope of the present specification is not to be construed as being limited to the examples described below. The examples of the present specification are provided in order to more fully describe the present specification to those having average knowledge in the art.

EXAMPLE AND COMPARATIVE EXAMPLE

Example 1

100 Parts by weight of a butyl acrylate (BA)/hydroxyethyl acrylate (HEA) copolymer solution (resin solid content 15.5 parts by weight) as an acryl-based adhesive resin, 0.10 parts by weight of the following Compound A-1 (Solvent Yellow 89, BASF Corporation) as an azo metal complex-based dye, 0.04 parts by weight of 1-39 (Soken Chemical & Engineering Co., Ltd.) (39% solution) as an isocyanate-based cross-linking agent, 0.07 parts by weight of T-789.1 (Soken Chemical & Engineering Co., Ltd.) (50% solution) as a silane-based coupling agent, 0.20 parts by weight of DBTDL (dibutyl tin dilaurate, Sigma-Aldrich) (1% solution) as a tin-based catalyst, 0.40 parts by weight of Kinox-80 (Hannong Chemicals, Inc.) (20% solution) as an antioxidant, 0.20 parts by weight of FC-4400A (3M Corporation) (70% solution) as an antistatic agent and 0.31 parts by weight of the following Compound 1-1 (Tinuvin 123, BASF Corporation), one type of the structure of Chemical Formula 1, were added to 25 parts by weight of methyl ethyl ketone (MEK), and mixed to prepare an adhesive composition, a coating solution. The molecular weight of Compound 1-1 was calculated as 737.15 g/mol. This was coated on release PET (RF12N, SKC), a base material, and dried so that the adhesive film had a thickness of 23 μm after the drying. On the adhesive film formed on the release PET (RF12N, SKC), release PET (RF02N, SKC) having different release force was attached.

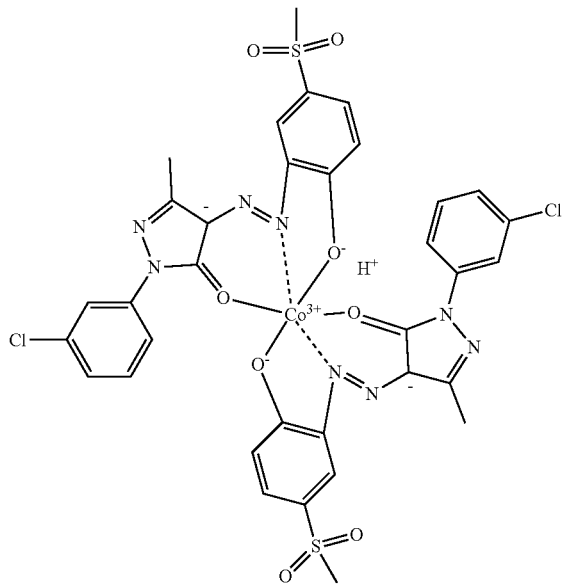

[Compound A-1]

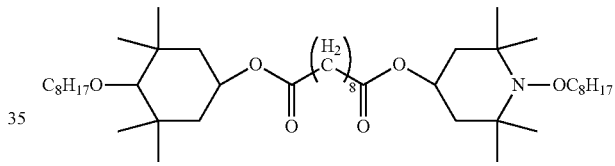

[Compound 1-1]

Example 2

Preparation was made in the same manner as in Example 1 except that the following Compound A-2 (Solvent Yellow 88, BASF Corporation) was used as the azo-based metal complex dye.

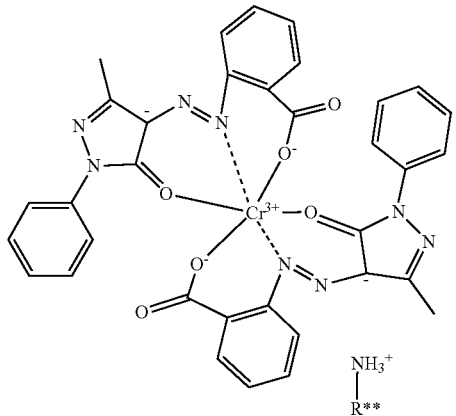

[Compound A-2]

In Compound A-2,
R** means an alkyl group having 12 to 14 carbon atoms.

Example 3

Preparation was made in the same manner as in Example 1 except that the following Compound A-3 (Solvent Yellow 82, BASF Corporation) was used as the azo-based metal complex dye.

[Compound A-3]

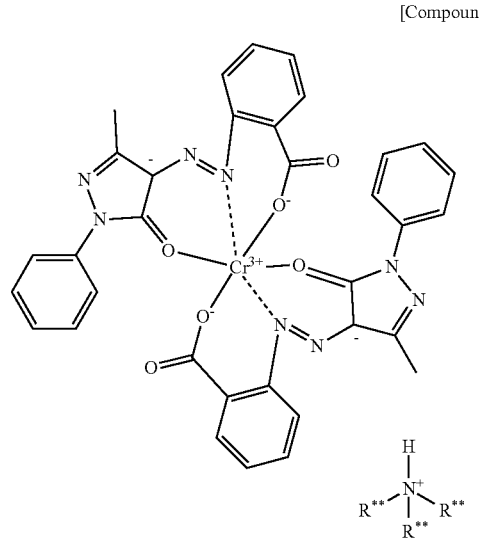

In Compound A-3,
R** means an alkyl group having 12 to 14 carbon atoms.

Example 4

Preparation was made in the same manner as in Example 1 except that the following Compound A-4 (Solvent Yellow 21, Orient Chemical, Ltd.) was used as the azo-based metal complex dye.

[Compound A-4]

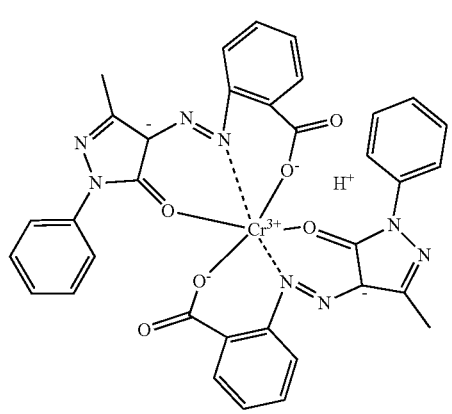

Example 5

Preparation was made in the same manner as in Example 1 except that the following Compound A-5 (Solvent Red 8, Orient Chemical, Ltd.) was used as the azo-based metal complex dye.

[Compound A-5]

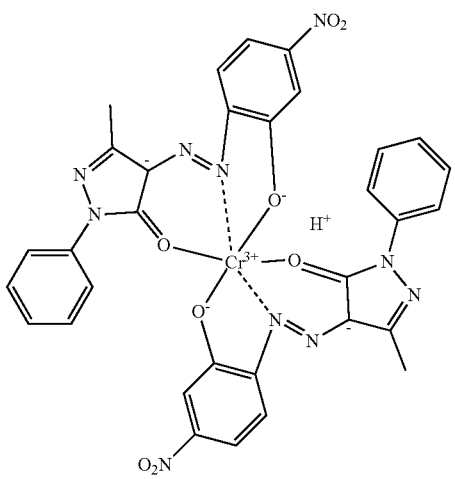

Example 6

Preparation was made in the same manner as in Example 1 except that the following Compound A-6 (Solvent Orange 11, BASF Corporation) having a mixture form of two different counter cations [sodium (50% to 60%), alkyl ammonium (40% to 50%)] was used as the azo-based metal complex dye.

[Compound A-6]

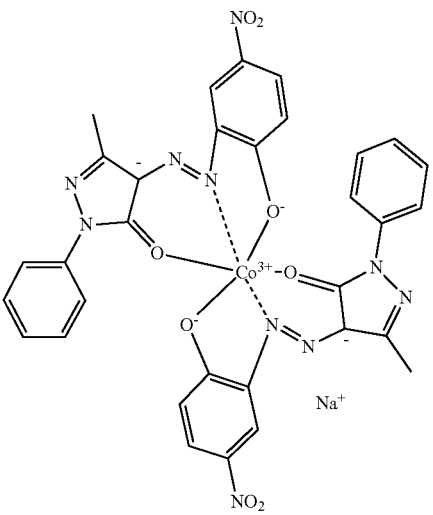

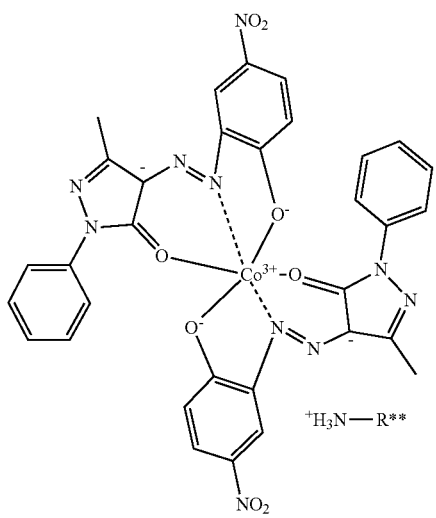

In Compound A-6,
R** means an alkyl group having 12 to 14 carbon atoms.

Example 7

Preparation was made in the same manner as in Example 1 except that the following Compound A-7 (Solvent Red 122, BASF Corporation) having a mixture (A: 94% to 96%, B: 4% to 6%) form of two different materials was used as the azo-based metal complex dye.

[Compound A-7]

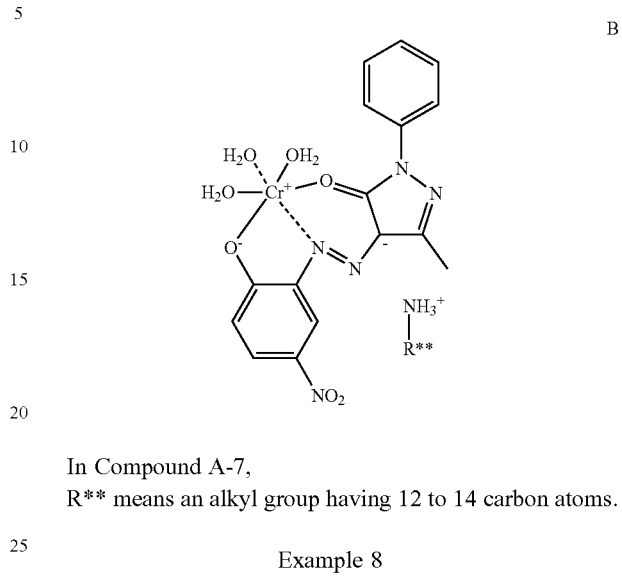

In Compound A-7,
R** means an alkyl group having 12 to 14 carbon atoms.

Example 8

Preparation was made in the same manner as in Example 1 except that Compound B-1 (Solvent Black 27, Orient Chemical, Ltd.) including an isomer of the following structure was used in 0.13 parts by weight as the azo-based metal complex dye.

[Compound B-1]

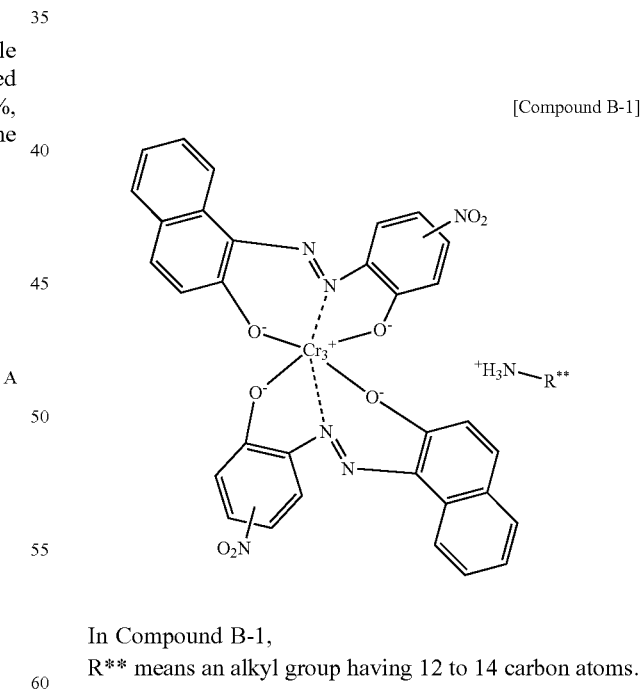

In Compound B-1,
R** means an alkyl group having 12 to 14 carbon atoms.

Example 9

Preparation was made in the same manner as in Example 1 except that Compound B-2 (Solvent Black 34, Orient Chemical, Ltd.) having the following structure was used in 0.13 parts by weight as the azo-based metal complex dye.

[Compound B-2]

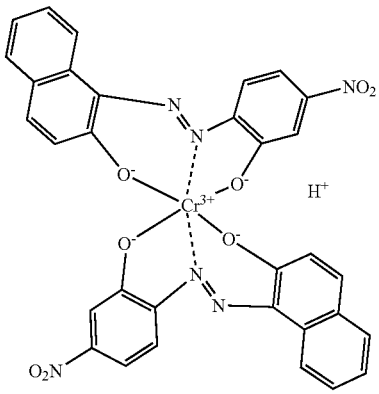

Example 10

Preparation was made in the same manner as in Example 1 except that Compound B-3 (Solvent Black 29, BASF Corporation) including isomers for each of the following structures was used in 0.13 parts by weight as the azo-based metal complex dye.

[Compound B-3]

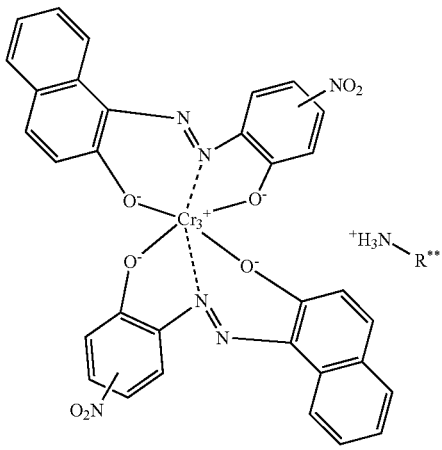

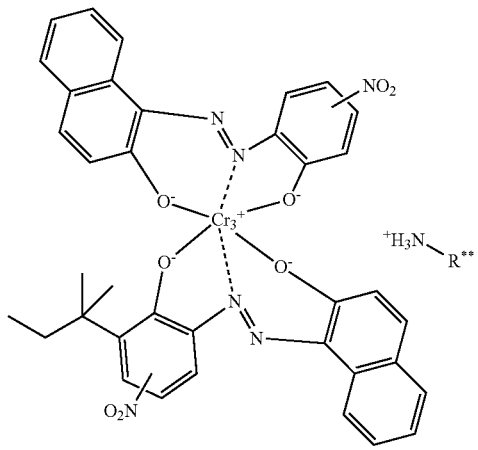

In Compound B-3,
R** means an alkyl group having 12 to 14 carbon atoms.

Example 11

Preparation was made in the same manner as in Example 1 except that Compound C-1 (Solvent Orange 99, BASF Corporation) having the following structure was further included in 0.10 parts by weight as the azo-based metal complex dye.

[Compound C-1]

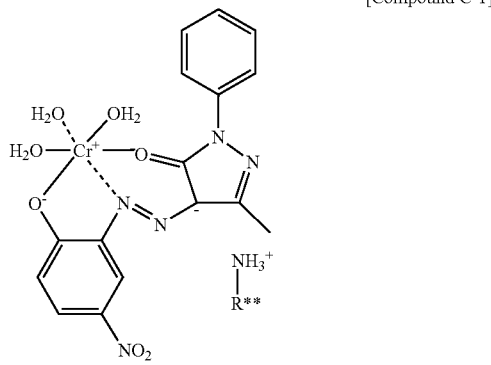

In Compound C-1,
R** means an alkyl group having 12 to 14 carbon atoms.

Comparative Example 1

Preparation was made in the same manner as in Example 1 except that the following Compound N-1 (Tinuvin 779DF, BASF Corporation) was used in 0.31 parts by weight instead of Compound 1-1 as the HALS material. The molecular weight of Compound N-1 was calculated as 480.74 g/mol.

[Compound N-1]

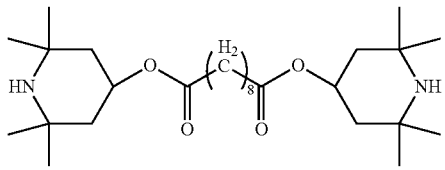

Comparative Example 2

Preparation was made in the same manner as in Example 1 except that the following Compound N-2 (Tinuvin 292, BASF Corporation) was used in 0.31 parts by weight instead of Compound 1-1. The molecular weight of Compound N-2 was calculated as 508.78 g/mol.

[Compound N-2]

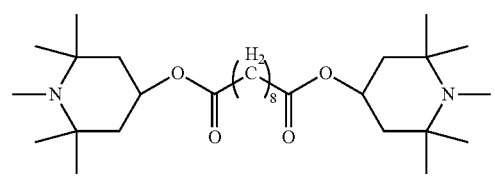

Comparative Example 3

Preparation was made in the same manner as in Example 1 except that Compound 1-1 was not used.

Comparative Example 4

Preparation was made in the same manner as in Example 2 except that Compound N-1 (Tinuvin 779DF, BASF Corporation) was used in 0.31 parts by weight instead of Compound 1-1.

Comparative Example 5

Preparation was made in the same manner as in Example 2 except that Compound N-2 (Tinuvin 292, BASF Corporation) was used in 0.31 parts by weight instead of Compound 1-1.

Comparative Example 6

Preparation was made in the same manner as in Example 2 except that Compound 1-1 was not used.

Comparative Example 7

Preparation was made in the same manner as in Example 3 except that Compound N-1 (Tinuvin 779DF, BASF Corporation) was used in 0.31 parts by weight instead of Compound 1-1.

Comparative Example 8

Preparation was made in the same manner as in Example 3 except that Compound N-2 (Tinuvin 292, BASF Corporation) was used in 0.31 parts by weight instead of Compound 1-1.

Comparative Example 9

Preparation was made in the same manner as in Example 3 except that Compound 1-1 was not used.

Comparative Example 10

Preparation was made in the same manner as in Example 4 except that Compound N-1 (Tinuvin 779DF, BASF Corporation) was used in 0.31 parts by weight instead of Compound 1-1.

Comparative Example 11

Preparation was made in the same manner as in Example 4 except that Compound N-2 (Tinuvin 292, BASF Corporation) was used in 0.31 parts by weight instead of Compound 1-1.

Comparative Example 12

Preparation was made in the same manner as in Example 4 except that Compound 1-1 was not used.

Comparative Example 13

Preparation was made in the same manner as in Example 5 except that Compound N-1 (Tinuvin 779DF, BASF Corporation) was used in 0.31 parts by weight instead of Compound 1-1.

Comparative Example 14

Preparation was made in the same manner as in Example 5 except that Compound N-2 (Tinuvin 292, BASF Corporation) was used in 0.31 parts by weight instead of Compound 1-1.

Comparative Example 15

Preparation was made in the same manner as in Example 5 except that Compound 1-1 was not used.

Comparative Example 16

Preparation was made in the same manner as in Example 6 except that Compound N-1 (Tinuvin 779DF, BASF Corporation) was used in 0.31 parts by weight instead of Compound 1-1.

Comparative Example 17

Preparation was made in the same manner as in Example 6 except that Compound N-2 (Tinuvin 292, BASF Corporation) was used in 0.31 parts by weight instead of Compound 1-1.

Comparative Example 18

Preparation was made in the same manner as in Example 6 except that Compound 1-1 was not used.

Comparative Example 19

Preparation was made in the same manner as in Example 7 except that Compound N-1 (Tinuvin 779DF, BASF Corporation) was used in 0.31 parts by weight instead of Compound 1-1.

Comparative Example 20

Preparation was made in the same manner as in Example 7 except that Compound N-2 (Tinuvin 292, BASF Corporation) was used in 0.31 parts by weight instead of Compound 1-1.

Comparative Example 21

Preparation was made in the same manner as in Example 7 except that Compound 1-1 was not used.

Comparative Example 22

Preparation was made in the same manner as in Example 8 except that Compound N-1 (Tinuvin 779DF, BASF Corporation) was used in 0.31 parts by weight instead of Compound 1-1.

Comparative Example 23

Preparation was made in the same manner as in Example 8 except that Compound N-2 (Tinuvin 292, BASF Corporation) was used in 0.31 parts by weight instead of Compound 1-1.

Comparative Example 24

Preparation was made in the same manner as in Example 8 except that Compound 1-1 was not used.

Comparative Example 25

Preparation was made in the same manner as in Example 9 except that Compound N-1 (Tinuvin 779DF, BASF Corporation) was used in 0.31 parts by weight instead of Compound 1-1.

Comparative Example 26

Preparation was made in the same manner as in Example 9 except that Compound N-2 (Tinuvin 292, BASF Corporation) was used in 0.31 parts by weight instead of Compound 1-1.

Comparative Example 27

Preparation was made in the same manner as in Example 9 except that Compound 1-1 was not used.

Comparative Example 28

Preparation was made in the same manner as in Example 10 except that Compound N-1 (Tinuvin 779DF, BASF Corporation) was used in 0.31 parts by weight instead of Compound 1-1.

Comparative Example 29

Preparation was made in the same manner as in Example 10 except that Compound N-2 (Tinuvin 292, BASF Corporation) was used in 0.31 parts by weight instead of Compound 1-1.

Comparative Example 30

Preparation was made in the same manner as in Example 10 except that Compound 1-1 was not used.

Comparative Example 31

Preparation was made in the same manner as in Example 11 except that Compound N-1 (Tinuvin 779DF, BASF Corporation) was used in 0.31 parts by weight instead of Compound 1-1.

Comparative Example 32

Preparation was made in the same manner as in Example 11 except that Compound N-2 (Tinuvin 292, BASF Corporation) was used in 0.31 parts by weight instead of Compound 1-1.

Comparative Example 33

Preparation was made in the same manner as in Example 11 except that Compound 1-1 was not used.

Measurement Example 1. Evaluation on Haze and Light Resistance Reliability of Film In order to measure light resistance reliability of the samples prepared in the examples and the comparative examples, light resistance reliability before/after reliability was compared using a Suntest XXL+ equipment.

Before the light resistance reliability analysis, the release PET (RF02N, SKC) on one surface of each of the samples prepared in the examples and the comparative examples was removed, a TAC (cellulose triacetate) film including an anti-reflection film was laminated, then the release PET (RF12N) on the other surface was removed, and the sample was attached to glass to conduct the evaluation. As for the reliability analysis condition, the evaluation was conducted for 300 h under a condition of Xe-Arc Lamp (0.32 W/m$^2$@340 nm). Reliability was determined by, after measuring luminous transmittance (Y) of the sample before/after the light resistance reliability evaluation, a change in the luminous transmittance values ($\Delta Y$) at a C light source. In general, light resistance reliability is considered to decrease as a change in the luminous transmittance ($\Delta Y$) increases after measuring reliability. The luminous transmittance at a C light source was measured using a JASCO (V-7100) equipment, and haze of the film was measured using a haze meter (NDH5000SP) equipment. The following Table 1 shows the change in the luminous transmittance ($\Delta Y$) and the haze value of each of the samples prepared in the examples and the comparative examples.

Measurement Example 2. Measurement of Gel Fraction

In a multifunctional acryl-based polymer material, gelation proceeds by crosslinking as a curing reaction proceeds. The method of measuring gel fraction is as follows. Each of the samples prepared in the examples and the comparative examples was stored for approximately 7 days at room temperature, and after the 7 days, a certain amount of the adhesive film remaining after removing the release PET on both sides was taken, and immersed in ethyl acetate for approximately 24 hours. The immersed solution was filtered through a mesh net, and then the solvent was completely dried. The portion where gelation proceeded by sufficient crosslinking remained in the mesh net and the portion that was not gelled was dissolved in the solvent and passed through the mesh net. The ratio of the difference in weights before and after the immersion was measured to calculate the gel fraction, and the results are shown in the following Table 1.

TABLE 1

| | Luminous Transmittance ($\Delta Y$) | Haze (%) | Gel Fraction (%) |
|---|---|---|---|
| Example 1 | 0.19 | 0.4 | 65.2 |
| Example 2 | 1.40 | 0.3 | 65.2 |
| Example 3 | 1.25 | 0.4 | 65.2 |
| Example 4 | 1.30 | 0.3 | 65.2 |
| Example 5 | 8.40 | 0.3 | 64.6 |
| Example 6 | 2.68 | 0.4 | 63.5 |
| Example 7 | 8.45 | 0.3 | 64.6 |
| Example 8 | 0.99 | 0.5 | 64.4 |
| Example 9 | 0.22 | 0.3 | 64.4 |
| Example 10 | 0.43 | 0.3 | 64.4 |
| Example 11 | 4.25 | 0.5 | 63.5 |
| Comparative Example 1 | 0.19 | 3.1 | 0.4 |
| Comparative Example 2 | 0.19 | 2.5 | 0.5 |
| Comparative Example 3 | 0.47 | 0.4 | 68.3 |
| Comparative Example 4 | 1.24 | 13.4 | 0.4 |
| Comparative Example 5 | 1.30 | 10.2 | 0.5 |
| Comparative Example 6 | 1.77 | 0.3 | 68.3 |
| Comparative Example 7 | 1.05 | 13.5 | 0.4 |
| Comparative Example 8 | 1.25 | 10.2 | 0.5 |
| Comparative Example 9 | 1.44 | 0.4 | 68.0 |
| Comparative Example 10 | 1.03 | 19.4 | 0.4 |
| Comparative Example 11 | 1.24 | 15.2 | 0.5 |
| Comparative Example 12 | 2.08 | 0.3 | 67.5 |
| Comparative Example 13 | 7.06 | 0.6 | 0.4 |
| Comparative Example 14 | 8.12 | 0.5 | 1.5 |

TABLE 1-continued

| | Luminous Transmittance (ΔY) | Haze (%) | Gel Fraction (%) |
|---|---|---|---|
| Comparative Example 15 | 20.26 | 0.3 | 65.2 |
| Comparative Example 16 | 2.52 | 2.4 | 0.4 |
| Comparative Example 17 | 2.65 | 1.8 | 1.2 |
| Comparative Example 18 | 3.98 | 0.4 | 62.5 |
| Comparative Example 19 | 6.55 | 4.1 | 0.4 |
| Comparative Example 20 | 8.45 | 3.1 | 1.1 |
| Comparative Example 21 | 25.21 | 0.3 | 63.4 |
| Comparative Example 22 | 0.77 | 7.1 | 0.4 |
| Comparative Example 23 | 0.85 | 5.8 | 0.5 |
| Comparative Example 24 | 1.83 | 0.5 | 64.6 |
| Comparative Example 25 | 0.47 | 5.0 | 0.4 |
| Comparative Example 26 | 0.47 | 4.2 | 0.5 |
| Comparative Example 27 | 1.82 | 0.3 | 64.6 |
| Comparative Example 28 | 0.52 | 3.3 | 0.4 |
| Comparative Example 29 | 0.50 | 1.8 | 1.2 |
| Comparative Example 30 | 1.40 | 0.3 | 64.6 |
| Comparative Example 31 | 2.86 | 4.1 | 0.4 |
| Comparative Example 32 | 4.20 | 3.4 | 1.3 |
| Comparative Example 33 | 16.96 | 0.5 | 60.4 |

Through the examples and the comparative examples, it was identified that light resistance reliability was improved regardless of the type of the hindered amine light stabilizer (HALS), however, the NR type hindered amine light stabilizer (HALS) of Compounds N-1 and N-2 significantly increased haze of the adhesive film when combined with the azo-based metal complex dye. In addition, the measured gel fraction was observed to be very low, and from this, it may be inferred that the NR type hindered amine light stabilizer (HALS) interfered with crosslinking of the adhesive film, and the adhesive film was hardly crosslinked. On the other hand, an increase in the haze was not observed when using the NOR type hindered amine light stabilizer (HALS) of Compound 1-1, and maintaining a high gel fraction value was identified. Accordingly, it is considered that using an NOR type hindered amine light stabilizer (HALS) is greatly preferred when using an azo-based metal complex dye in an adhesive film having a crosslinking reaction. As a result, it was identified that the display device according to the present specification, particularly the OLED device, did not cause haze by including the adhesive film and thereby was able to increase clarity, and had very superior light resistance reliability.

The invention claimed is:

1. An adhesive composition comprising:
an acryl-based adhesive resin;
an azo-based metal complex dye; and
a compound having a functional group represented by the following Chemical Formula 1:

[Chemical Formula 1]

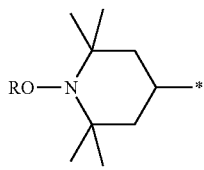

wherein, in the Chemical Formula 1,
'—' is a site bonding to other substituents or bonding sites; and
R is a substituted or unsubstituted alkyl group.

2. The adhesive composition of claim 1, comprising at least one selected from the group consisting of an antistatic agent, a crosslinking agent, an antioxidant, a tin-based catalyst and a coupling agent.

3. The adhesive composition of claim 1, wherein R in the Chemical Formula 1 is a substituted or unsubstituted alkyl group having 1 to 10 carbon atoms.

4. The adhesive composition of claim 1, wherein the compound having the functional group represented by Chemical Formula 1 has a molecular weight of 700 g/mol to 750 g/mol.

5. The adhesive composition of claim 1, wherein the azo-based metal complex dye is a compound represented by the following Chemical Formula A or Chemical Formula B:

[Chemical Formula A]

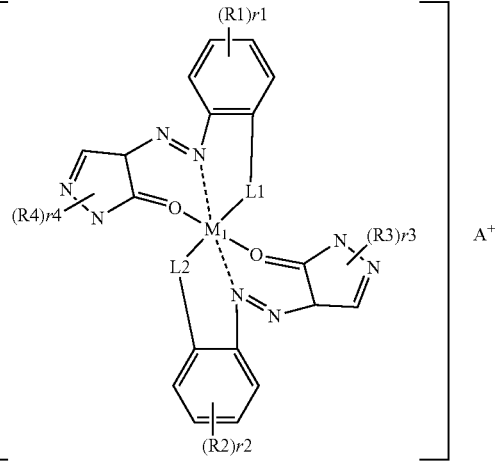

[Chemical Formula B]

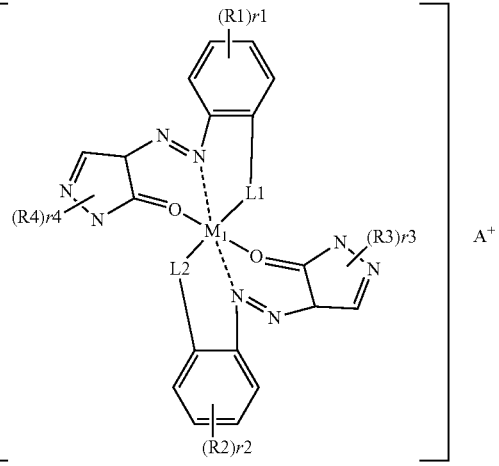

in the Chemical Formulae A and B,
L1 to L4 are the same as or different from each other, and each independently —O—; or —COO—;
R1 to R8 are the same as or different from each other, and each independently hydrogen; a halogen group; a substituted or unsubstituted alkyl group; a substituted or unsubstituted aryl group; $-NO_2$; $-SO_3R'$; $-SO_2R''$; or $-NHCOR'''$;
R', R" and R'" are the same as or different from each other, and each independently hydrogen; or a substituted or unsubstituted alkyl group;

r1 is an integer of 1 to 4, and when r1 is 2 or greater, R1 s are the same as or different from each other;

r2 is an integer of 1 to 4, and when r2 is 2 or greater, R2s are the same as or different from each other;

r3 is an integer of 1 to 3, and when r3 is 2 or greater, R3s are the same as or different from each other;

r4 is an integer of 1 to 3, and when r4 is 2 or greater, R4s are the same as or different from each other;

r5 is an integer of 1 to 6, and when r5 is 2 or greater, R5s are the same as or different from each other;

r6 is an integer of 1 to 6, and when r6 is 2 or greater, R6s are the same as or different from each other;

r7 is an integer of 1 to 4, and when r7 is 2 or greater, R7s are the same as or different from each other;

r8 is an integer of 1 to 4, and when r8 is 2 or greater, R8s are the same as or different from each other;

M1 and M2 are the same as or different from each other, and each independently $Cr^{3+}$; or $Co^{3+}$; and A and B are the same as or different from each other, and each independently hydrogen; an alkali metal; $NH_4$; a substituted or unsubstituted alkylammonium; or a substituted or unsubstituted cycloalkylammonium.

6. The adhesive composition of claim 5, wherein the azo-based metal complex dye further includes a compound represented by the following Chemical Formula C:

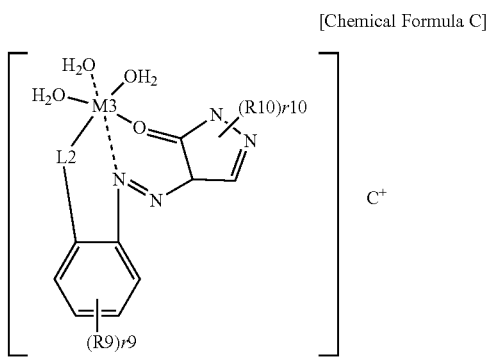

[Chemical Formula C]

in the Chemical Formula C,

L2 is —O—; or —COO—;

R9 and R10 are the same as or different from each other, and each independently hydrogen; a substituted or unsubstituted alkyl group; a substituted or unsubstituted aryl group; —$NO_2$; or —$SO_3R'$;

R' is hydrogen; or a substituted or unsubstituted alkyl group;

r9 is an integer of 1 to 4, and when r9 is 2 or greater, R9s are the same as or different from each other;

r10 is an integer of 1 to 3, and when r10 is 2 or greater, R10s are the same as or different from each other;

M3 is $Cr^+$; and

C is hydrogen; an alkali metal; $NH_4$; a substituted or unsubstituted alkylammonium; or a substituted or unsubstituted cycloalkylammonium.

7. The adhesive composition of claim 1, wherein the compound having the functional group represented by Chemical Formula 1 is represented by the following Chemical Formula 1-1:

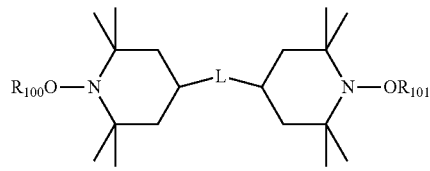

[Chemical Formula 1-1]

in the Chemical Formula 1-1, $R_{100}$ and $R_{101}$ are the same as or different from each other, and each independently a substituted or unsubstituted alkyl group;

L is —OCO-L'-OCO—; and

L' is a substituted or unsubstituted alkylene group.

8. The adhesive composition of claim 1, comprising:

the acryl-based adhesive resin in 10 parts by weight to 30 parts by weight;

the azo-based metal complex dye in 0.01 parts by weight to 5 parts by weight and the compound having the functional group represented by Chemical Formula 1 in 0.1 parts by weight to 10 parts by weight.

9. An adhesive film comprising the adhesive composition of claim 1 or a cured material thereof.

10. An adhesive film comprising:

an acryl-based adhesive resin;

an azo-based metal complex dye; and a compound having a functional group represented by the following Chemical Formula 1:

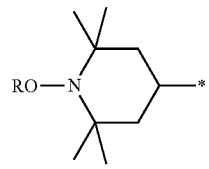

[Chemical Formula 1]

wherein, in the Chemical Formula 1,

'— is a site bonding to other substituents or bonding sites; and

R is a substituted or unsubstituted alkyl group.

11. The adhesive film of claim 9, further comprising a release layer provided on one surface of the adhesive film.

12. An adhesive optical filter comprising:

the adhesive film of claim 9; and an anti-reflection film provided on one surface of the adhesive film.

13. The adhesive optical filter of claim 12, further comprising a base material between the adhesive film and the anti-reflection film.

14. A display device comprising the adhesive optical filter of claim 12.

15. The display device of claim 14, wherein the display device is an OLED device including an OLED panel; and the adhesive optical filter provided on one surface of the OLED panel.

16. The adhesive film of claim 10, further comprising a release layer provided on one surface of the adhesive film.

17. An adhesive optical filter comprising:

the adhesive film of claim 10; and an anti-reflection film provided on one surface of the adhesive film.

18. The adhesive optical filter of claim 17, further comprising a base material between the adhesive film and the anti-reflection film.

19. A display device comprising the adhesive optical filter of claim 17.

20. The display device of claim 19, wherein the display device is an OLED device including an OLED panel; and the adhesive optical filter provided on one surface of the OLED panel.

\* \* \* \* \*